(12) United States Patent
Couillard (10) Patent No.: US 6,973,565 B2
(45) Date of Patent: Dec. 6, 2005

(54) BIOMETRICALLY SECURED MEMORY IC

(75) Inventor: Bruno Couillard, Gatineau (CA)

(73) Assignee: Safenet Canada, Inc., Belcamp, MD (US)

( * ) Notice: Subject to any disclaimer, the term of this patent is extended or adjusted under 35 U.S.C. 154(b) by 903 days.

(21) Appl. No.: 09/851,252

(22) Filed: May 9, 2001

(65) Prior Publication Data

US 2002/0167394 A1    Nov. 14, 2002

(51) Int. Cl.$^7$ ............................................. G06F 17/00
(52) U.S. Cl. ..................................... 713/100; 713/713
(58) Field of Search ............................. 713/182–186, 713/189–194, 1, 2, 100, 200–202

(56) References Cited

U.S. PATENT DOCUMENTS

| | | |
|---|---|---|
| 4,353,056 A | 10/1982 | Tsikos |
| 4,951,249 A | 8/1990 | McClung et al. |
| 5,109,427 A | 4/1992 | Yang |
| 5,187,482 A | 2/1993 | Tiemann et al. |
| 5,187,748 A | 2/1993 | Lee |
| 5,233,404 A | 8/1993 | Lougheed et al. |

OTHER PUBLICATIONS http://www.fingerprint.se/page.asp!section=news&newsID=193.*
http://www.atmel.com/dyn/resources/prod_documents/FingerChip_WhitePaper_11_12_02.pdf.*
http://www.icma.com/info/refining111201.htm.*

* cited by examiner

Primary Examiner—David Jung
(74) Attorney, Agent, or Firm—Venable LLP; James R. Burdett; Edward W. Yee (57) ABSTRACT

A biometrically secured memory IC is disclosed for biometrically securing digital data stored therein. The memory IC comprises a biometric sensing device such as a fingerprint imager and an integrated circuit. The biometric sensing device and the integrated circuit are irremovably bonded together such that the sensing device and the integrated circuit form a single physical unit. Biometric information provided to the sensing device is captured and a signal indicative of the biometric information is provided to the integrated circuit. The signal is then converted into digital data indicative of the signal using an A/D converter. A processor compares the digital data indicative of the biometric information with first digital data indicative of a biometric characteristic of an authorized user, which is stored in first memory to produce a comparison result. If the comparison result is indicative of a match the processor provides access to second digital data stored in second memory. The integrated circuit further comprises a port for providing and/or receiving second digital data. The circuitry for the A/D converter, the processor, first memory and second memory are all contained within a single integrated circuit. With an aspect of the invention there is further disclosed a method for copying second digital data from a first biometrically secured memory IC to a second void biometrically secured memory IC. The combination of the data storage as well as the biometric security system in a single unit such as a chip provides a substantially tamperproof device making it next to impossible to access the data without destroying the device.

23 Claims, 5 Drawing Sheets

Fig. 1 establishing a trusted communication link between a first biometrically secured memory IC and a second biometrically secured memory IC, wherein each of the first and the second biometrically secured memory IC comprise a biometric sensing device and an integrated circuit, which is irremovably bonded to the biometric sensing device such that the biometric sensing device and the integrated circuit form a single physical unit transmitting first digital data indicative of biometric information of an authorized user of the first biometrically secured memory IC from first memory of the first biometrically secured memory IC to first memory of the second biometrically secured memory IC for storage therein transmitting second digital data from second memory of the first biometrically secured memory IC to second memory of the second biometrically secured memory IC for storage therein, wherein the second digital data comprise other digital data than digital data indicative of biometric information of an authorized user

Fig. 2a

Fig. 2b mating of a connector of a first biometrically secured memory IC with a first connector of a trusted peripheral device, wherein the first biometrically secured memory IC comprises a biometric sensing device and an integrated circuit, which is irremovably bonded to the biometric sensing device such that the biometric sensing device and the integrated circuit form a single physical unit mating of a connector of a second biometrically secured memory IC with a second connector of the trusted peripheral device, wherein the second biometrically secured memory IC comprises a biometric sensing device and an integrated circuit, which is irremovably bonded to the biometric sensing device such that the biometric sensing device and the integrated circuit form a single physical unit establishing a trusted communication link between a first biometrically secured memory IC and a second biometrically secured memory IC transmitting first digital data indicative of biometric information of an authorized user of the first biometrically secured memory IC from first memory of the first biometrically secured memory IC to first memory of the second biometrically secured memory IC for storage therein transmitting second digital data from second memory of the first biometrically secured memory IC to second memory of the second biometrically secured memory IC for storage therein, wherein the second digital data comprise other digital data than digital data indicative of biometric information of an authorized user

BIOMETRICALLY SECURED MEMORY IC

FIELD OF THE INVENTION

The invention relates generally to integrated circuits, in particular to a biometrically secured memory IC and a method for copying data to a void biometrically secured memory IC.

BACKGROUND OF THE INVENTION

The use of security systems is fast becoming an important issue. Their use is increasing with greater availability of digital electronic components at a relatively low cost. Such systems are known for securing buildings, banks, automobiles, computers and many other devices. A common method of providing security is using passwords. Password protection and/or combination type locks are employed for computer network security, automatic teller machines, telephone banking, calling cards, telephone answering services, houses, and safes. These systems generally require the knowledge of an entry code that has been selected by a user or has been preset. For example, U.S. Pat. No. 4,951,249 discloses a computer security system, which protects computer software from unauthorized access by requiring the user to supply a name and a password during the operating system loading procedure ("boot-up") of a personal computer (PC).

Preset codes are often forgotten as users have no reliable method of remembering them. Writing down the codes and storing them in close proximity to the access control device (i.e. the combination lock) results in a secure access control system with a very insecure code. Alternatively, the nuisance of trying several code variations renders the access control system more of a problem than a solution. Password systems are known to suffer from other disadvantages. Usually, a user specifies passwords. Most users, being unsophisticated users of security systems, choose passwords, which are relatively insecure. As such, many password systems are easily accessed through a simple trial and error process.

A security access system that provides substantially secure access and does not require a password or access code is a biometric identification system. A biometric identification system accepts unique biometric information from a user and identifies the user by matching the information against information belonging to registered users of the system. One such biometric identification system is a fingerprint recognition system.

In a fingerprint input transducer or sensor, the finger under investigation is usually pressed against a flat surface, such as a side of a glass plate; the ridge and valley pattern of the finger tip is sensed by a sensing means such as an interrogating light beam.

Various optical devices are known which employ prisms upon which a finger whose print is to be identified is placed. The prism has a first surface upon which a finger is placed, a second surface disposed at an acute angle to the first surface through which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404. Fingerprint identification devices of this nature are generally used to control the building-access or information-access of individuals to buildings, rooms, and devices such as computer terminals.

U.S. Pat. No. 4,353,056 in the name of Tsikos issued Oct. 5, 1982, discloses an alternative kind of fingerprint sensor that uses a capacitive sensing approach. The described sensor has a two dimensional, row and column, array of capacitors, each comprising a pair of spaced electrodes, carried in a sensing member and covered by an insulating film. The sensors rely upon deformation to the sensing member caused by a finger being placed thereon so as to vary locally the spacing between capacitor electrodes, according to the ridge/trough pattern of the fingerprint, and hence, the capacitance of the capacitors. In one arrangement, the capacitors of each column are connected in series with the columns of capacitors connected in parallel and a voltage is applied across the columns. In another arrangement, a voltage is applied to each individual capacitor in the array. Sensing in the respective two arrangements is accomplished by detecting the change of voltage distribution in the series connected capacitors or by measuring the voltage values of the individual capacitances resulting from local deformation. To achieve this, an individual connection is required from the detection circuit to each capacitor.

Before the advent of computers and imaging devices, research was conducted into fingerprint characterisation and identification. Today, much of the research focus in biometrics has been directed toward improving the input transducer and the quality of the biometric input data. Fingerprint characterization is well known and can involve many aspects of fingerprint analysis. The analysis of fingerprints is discussed in the following references which are hereby incorporated by reference:

Xiao Qinghan and Bian Zhaoqi, An approach to Fingerprint Identification By Using the Attributes of Feature Lines of Fingerprint," IEEE Pattern Recognition, pp 663, 1986;

C. B. Shelman, "Fingerprint Classification—Theory and Application," Proc. 76 Carnahan Conference on Electronic Crime Countermeasures, 1976;

Feri Pernus, Stanko Kovacic, and Ludvik Gyergyek, "Minutaie Based Fingerprint Registration," IEEE Pattern Recognition, pp 1380, 1980;

J. A. Ratkovic, F. W. Blackwell, and H. H. Bailey, "Concepts for a Next Generation Automated Fingerprint System," Proc. 78 Carnahan Conference on Electronic Crime Countermeasures, 1978;

K. Millard, "An approach to the Automatic Retrieval of Latent Fingerprints," Proc. 75 Carnahan Conference on Electronic Crime Countermeasures, 1975;

Moayer and K. S. Fu, "A Syntactic Approach to Fingerprint Pattern Recognition," Memo Np. 73–18, Purdue University, School of Electrical Engineering, 1973;

Wegstein, *An Automated Fingerprint Identification System*, NBS special publication, U.S. Department of Commerce/National Bureau of Standards, ISSN 0083–1883; no. 500–89, 1982;

Moenssens, Andre A., *Fingerprint Techniques*, Chilton Book Co., 1971; and,

Wegstein and J. F. Rafferty, *The LX39 Latent Fingerprint Matcher*, NBS special publication, U.S. Department of Commerce/National Bureau of Standards; no. 500–36, 1978.

Biometric security identification systems, such as fingerprint scanning and input devices are becoming more commonplace as the need to validate authorized users of computers, databases, and secure spaces grows. As computers become more miniaturized, so too are other communication and security devices decreasing in size. One of the more important reasons, however, to miniaturize electronic devices is to lessen the burden of porting them.

With increasing miniaturization in the microprocessor technology so has also decreased the size of available biometric sensors, for example, capacitive fingerprint sensors. For instance, U.S. Pat. No. 6,049,620 discloses a fingerprint-sensing device comprising a planar array of closely spaced capacitive sense elements and circuitry to read out the value of each sense element in a single unit.

Unfortunately, capacitive fingerprint sensors are fragile and are subject to damage after repeated application of pressure from a fingertip. When a sensor is damaged it needs to be replaced. Unfortunately, secure replacement of a fingerprint sensor is not possible in accordance with present technology. For example, if a fingerprint is used to secure encryption keys, then damage to the sensor results in the keys being lost or the keys being available to the technician replacing the sensor. Either way, the entire security apparatus is compromised by making existing data inaccessible or by making the secret keys accessible.

It is, therefore, an object of the invention to provide a biometrically secured memory IC comprising memory, a biometric sensor and a processor in a single unit.

It is further an object of the invention to provide a method for copying digital data to a void biometrically secured memory IC.

SUMMARY OF THE INVENTION

In accordance with the present invention there is provided a biometrically secured memory IC comprising:

a sensing device for receiving biometric information provided thereto and for providing a signal indicative of the biometric information;

an integrated circuit irremovably bonded to the sensing device such that the sensing device and the integrated circuit form a single physical unit, the integrated circuit comprising:

an A/D converter for receiving the signal indicative of the biometric information and for providing digital data indicative of the signal;

first memory for storing first digital data, wherein the first digital data comprise digital data indicative of biometric information of an authorized user of the memory IC;

second memory for storing second digital data, wherein the second digital data comprise other digital data than digital data indicative of biometric information of an authorized user;

a processor for receiving the digital data indicative of the biometric information, for comparing the digital data indicative of the biometric information with the first digital data to produce a comparison result, and if the comparison result is indicative of a match for providing access to the second memory; and, a port for providing and/or receiving the second digital data.

In accordance with the present invention there is further provided a biometrically secured memory IC comprising:

a capacitive fingerprint imager for receiving fingerprint information provided thereto and for providing a signal indicative of the fingerprint information;

an integrated circuit irremovably bonded to the capacitive fingerprint imager such that the capacitive fingerprint imager and the integrated circuit form a single physical unit, the integrated circuit comprising:

an A/D converter for receiving the signal indicative of the fingerprint information and for providing digital data indicative of the signal;

first non-volatile memory for storing first digital data, wherein the first digital data comprise digital data indicative of fingerprint information of an authorized user of the memory IC;

second memory for storing second digital data, wherein the second digital data comprise other digital data than digital data indicative of fingerprint information of an authorized user;

a processor for receiving the digital data indicative of the fingerprint information, for comparing the digital data indicative of the fingerprint information with the first digital data to produce a comparison result, and if the comparison result is indicative of a match for providing secured access to the second memory; and, a port for providing and/or receiving the second digital data.

In accordance with an aspect of the present invention there is provided a biometrically secured memory IC wherein the port comprises a socket for removably joining the biometrically secured memory IC to an electronic device and wherein the socket is irremovably bonded to the integrated circuit.

In accordance with the aspect of the present invention there is further provided a biometrically secured memory IC, wherein the integrated circuit, the sensing device and the socket form a physical unit such that an attempt by an unauthorized person to access the second digital data results in erasing of the digital data stored within the memory.

In accordance with another aspect of the present invention there is provided a method for copying digital data to a void biometrically secured memory IC comprising the steps of:

a) establishing a trusted communication link between a first biometrically secured memory IC and a second biometrically secured memory IC, wherein each of the first and the second biometrically secured memory IC comprise a biometric sensing device and an integrated circuit, which is irremovably bonded to the biometric sensing device such that the biometric sensing device and the integrated circuit form a single physical unit;

b) transmitting first digital data indicative of biometric information of an authorized user of the first biometrically secured memory IC from first memory of the first biometrically secured memory IC to first memory of the second biometrically secured memory IC for storage therein; and, c) transmitting second digital data from second memory of the first biometrically secured memory IC to second memory of the second biometrically secured memory IC for storage therein, wherein the second digital data comprise other digital data than digital data indicative of biometric information of an authorized user.

In accordance with the other aspect of the present invention there is provided a method for copying digital data to a void biometrically secured memory IC, the method further comprising the steps of:

capturing biometric information provided to the biometric sensing device of the second biometrically secured memory IC, the biometric sensing device providing a signal indicative of the sensed biometric information;

converting the signal indicative of the sensed biometric information into captured digital data using an A/D converter integrated in the integrated circuit of the second biometrically secured memory IC;

transmitting the captured digital data to the first biometrically secured memory IC;

using a processor integrated in the integrated circuit of the first biometrically secured memory IC, comparing the captured digital data with the first digital data stored in the first memory of the first biometrically secured memory IC to produce a comparison result; and, if the comparison result is indicative of a match, communicating with a processor integrated in the integrated circuit of the second biometrically secured memory IC for preparing the transmission of the first and the second digital data.

In accordance with yet another aspect of the present invention there is provided a method for copying digital data to a void biometrically secured memory IC comprising the steps of:

a) mating of a connector of a first biometrically secured memory IC with a first connector of a trusted peripheral device, wherein the first biometrically secured memory IC comprises a biometric sensing device and an integrated circuit, which is irremovably bonded to the biometric sensing device such that the biometric sensing device and the integrated circuit form a single physical unit;

b) mating of a connector of a second biometrically secured memory IC with a second connector of the trusted peripheral device, wherein the second biometrically secured memory IC comprises a biometric sensing device and an integrated circuit, which is irremovably bonded to the biometric sensing device such that the biometric sensing device and the integrated circuit form a single physical unit;

c) establishing a trusted communication link between a first biometrically secured memory IC and a second biometrically secured memory IC;

d) transmitting first digital data indicative of biometric information of an authorized user of the first biometrically secured memory IC from first memory of the first biometrically secured memory IC to first memory of the second biometrically secured memory IC for storage therein; and, e) transmitting second digital data from second memory of the first biometrically secured memory IC to second memory of the second biometrically secured memory IC for storage therein, wherein the second digital data comprise other digital data than digital data indicative of biometric information of an authorized user.

It would be advantageous to use now available processing technologies for manufacturing integrated circuits such as CMOS technology to provide a biometrically secured memory IC. Such a device would provide secure storage of data using a biometric security system for providing access only to an authorized user in one unit. Combining the data storage as well as the biometric security system in a single unit such as a chip provides a substantially tamperproof device making it next to impossible to access the data without destroying the device.

BRIEF DESCRIPTION OF FIGURES

Exemplary embodiments of the invention will now be described in conjunction with the following drawings, in which:

FIG. 2b is a simplified flow diagram of an aspect of the method according to the invention illustrated in FIG. 2a;

FIG. 3a is a simplified flow diagram of another method according to the invention for copying digital data to a void biometrically secured memory IC; and, FIG. 3b is a simplified flow diagram of an aspect of the method according to the invention illustrated in FIG. 3a.

DETAILED DESCRIPTION OF PREFERRED EMBODIMENTS

Figure 1:
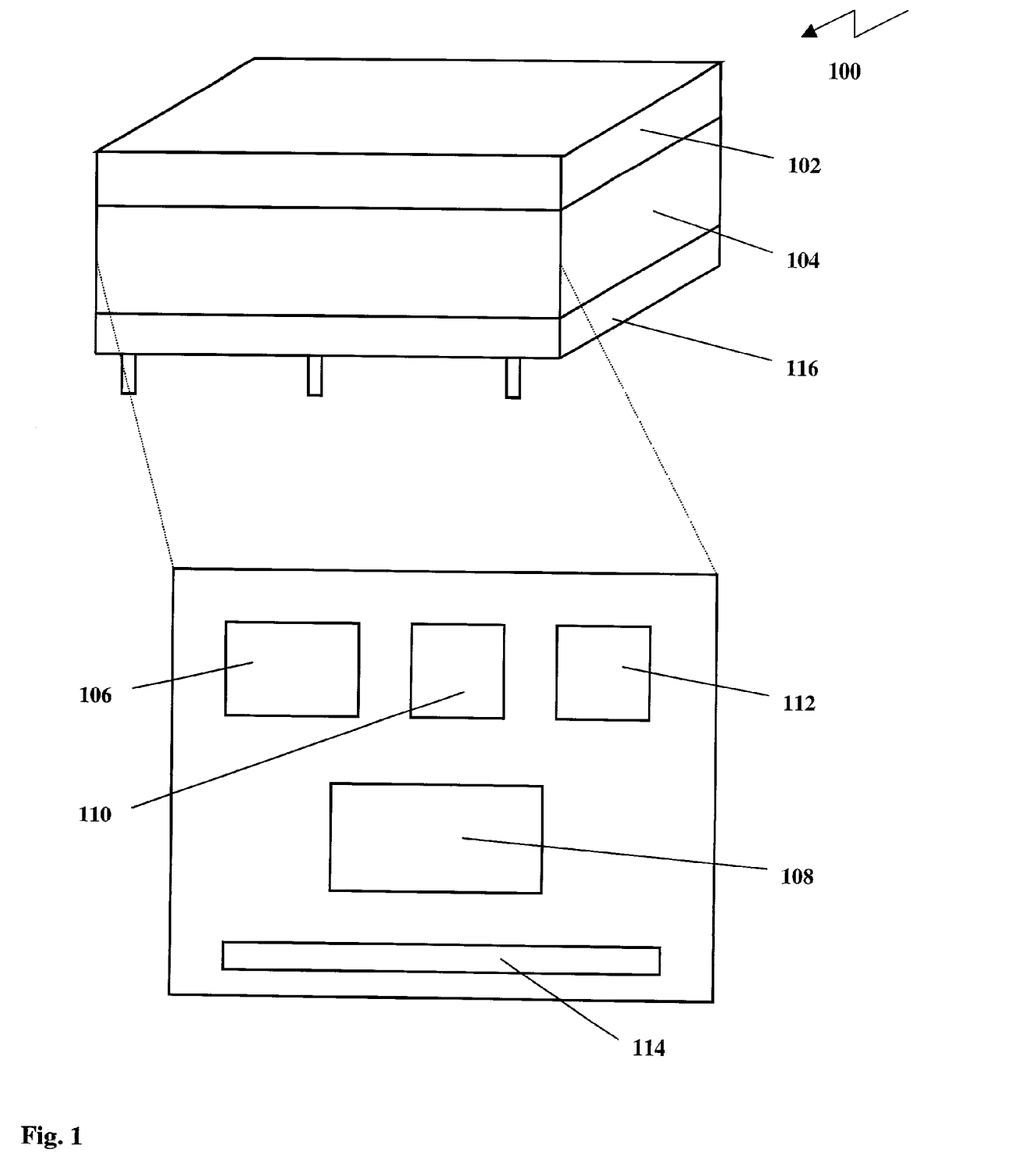
FIG. 1 is a simplified block diagram of a biometrically secured memory IC according to the invention.

FIG. 1 illustrates a simplified block diagram of a biometrically secured memory IC 100 according to the invention. The memory IC 100 comprises a biometric sensing device 102 such as a fingerprint imager and an integrated circuit 104. In a preferred embodiment the biometric sensing device 102 comprises a capacitive fingerprint imager for its compact design. The biometric sensing device 102 and the integrated circuit 104 are irremovably bonded together such that the sensing device 102 and the integrated circuit 104 form a single physical unit. Biometric information provided to the sensing device 102 is captured and a signal indicative of the biometric information is provided to the integrated circuit 104. The signal is then converted into digital data indicative of the signal using an A/D converter 106. A processor 108 compares the digital data indicative of the biometric information with first digital data indicative of a biometric characteristic of an authorized user, which is stored in first memory 110, to produce a comparison result. Optionally, the first digital data comprise data indicative of a biometric characteristic of a plurality of authorized users. If the comparison result is indicative of a match the processor 108 provides access to second digital data stored in second memory 112. As is evident, there are numerous applications for the secured memory using, for example, RAM providing a biometrically secured RAM stick. Alternatively, the second memory comprises ROM or write once ROM. The integrated circuit 104 further comprises a port 114 for providing and/or receiving second digital data. The circuitry for the A/D converter 106, the processor 108, first memory 110 and second memory 112 are all contained in the single integrated circuit 104.

The sensing device 102 comprises an array of sense elements for capturing a fingerprint. In one embodiment each sensing element of the sensing device 102 is directly connected to the integrated circuit 104 and the integrated circuit 104 comprises circuitry for combining the signals of the sense elements before provision to the A/D converter 106. Alternatively, the sensing device comprises the circuitry necessary for combining the signals of the sense elements before provision to the integrated circuit 104. For example, a platen of a capacitive fingerprint imager is irremovably bonded to the integrated circuit 104 using an adhesive. In this case, it is advantageous if the platen comprises the circuitry for combining the signals of the various sense elements before provision to the integrated circuit 104, facilitating manufacture of the memory IC 100. Alternatively, the sense elements are capacitive solid state sensors. This allows the manufacture of the sensing device 102 and the integrated circuit 104 in a single unit using, for example, conventional CMOS processing techniques.

The port 114 comprises a connector 116 irremovably bonded to the integrated circuit 104 for connecting the memory IC 100 to electronic devices such as a computer, a printer, a digital camera, etc. for receiving and/or providing the second digital data upon successful authorization of a user. Preferably, the connector is designed for directly mating with a respective connector of the electronic device, reducing the risk of access to the second data by an unauthorized person. Optionally, the integrated circuit comprises a connector for providing a trusted communication link for copying the first and second data to another biometrically secured memory IC. In a preferred embodiment the connector is designed for directly mating with a respective connector of the other memory IC. In yet another embodiment the port 114 comprises an IC socket for joining the memory IC 100 to another electronic device such as a smart card. Preferably, the memory IC 100 is removable for replacement with another memory IC in case of a malfunction.

Recent advances in the manufacturing technologies of integrated circuits allow producing IC's of increasing functionality and processing capabilities in ever smaller sized devices. For example, using these recent technologies it is possible to produce a processor 108 of the integrated circuit 104 capable of performing numerous functions other than comparing the biometric data and providing access to the second memory 112. Such other functions include processing of the digital data upon successful identification of an authorized user, for example, encrypting/decrypting at least a portion of the second digital data, thus enhancing security. Furthermore, such other functions comprise commands received as second digital data to be executed by the processor 108 upon successful identification of an authorized user. For example, a smart card comprising a biometrically secured memory IC according to the invention is used as a credit card. Here, an authorized user inserts the smart card into a slot of a teller machine and provides a fingerprint to the biometric sensor. Upon successful identification he provides commands to the teller machine, which are received at a processor of the biometrically secured memory IC as second digital data. The processor then processes any transaction selected by the user in communication with a processor of the teller machine. Furthermore, information about account statements and history of transactions is stored in the second memory.

Yet another example of other functions performed by the processor is to provide, for instance, write access to the second memory without authorization whereas authorization is required to read the second data. This allows an authorized user to let a staff member store data into the second memory without authorization, while the staff member is not able to access any data stored in the second memory. As is evident, the reverse is possible as well and useful in numerous applications.

In the field of digital and analog communications, wireless devices are becoming more commonplace. Inexpensive computer systems are currently commercially available wherein printers communicate with computers that in turn communicate with other computers via infrared transmitters and receivers. Miniaturization of semiconductor lasers allows integration of a wireless communication capability into the integrated circuit 104 at the port 114 for wireless transmission of the second data. Preferably, the biometrically secured memory IC still comprises a port for mating with another biometrically secured memory IC, thus preventing loss of the second digital data in case of a malfunction of the infrared laser.

The biometrically secured memory device according to the invention combines data storage as well as a biometric security system in a single physical unit such as a chip and, therefore, provides a substantially tamperproof device making it next to impossible to access the data without destroying the device. The device is advantageous in numerous applications where data security is of concern. Furthermore, it combines portability and functionality in a miniature device allowing use, for example, in a smart card. Advances in the manufacturing technologies of integrated circuits allow cheap mass production of biometrically secured memory ICs for secure data storage. Such miniature memory ICs are easily connected, for example, to a computer, a digital camera, a voice recorder or even a cell-phone.

The biometrically secured memory IC is preauthorized for use by a particular person or a plurality of persons. Prior to operation an administrator, or alternatively an authorized user, initializes the void biometrically secured memory IC with the assistance of either a central computer or a personal computer. Alternatively, a first user of the biometrically secured memory IC providing biometric information to the biometric sensor after fabrication is designated as authorized user and biometric data in dependence upon the captured biometric characteristic are stored in the first memory.

Due to repeated contacts with a fingertip during use of the device the sensing elements will suffer abrasion leading finally to a failure of the sense elements. While the failure of a small number of the sense elements does not affect reliable biometric identification of an authorized user and, therefore, can be ignored, failure of a larger number of sense elements will substantially affect identification. For security reasons it is preferable that in such a case access to the second memory is denied requiring copying of the second data to another biometrically secured memory IC via a trusted communication link.

Figure 2A:
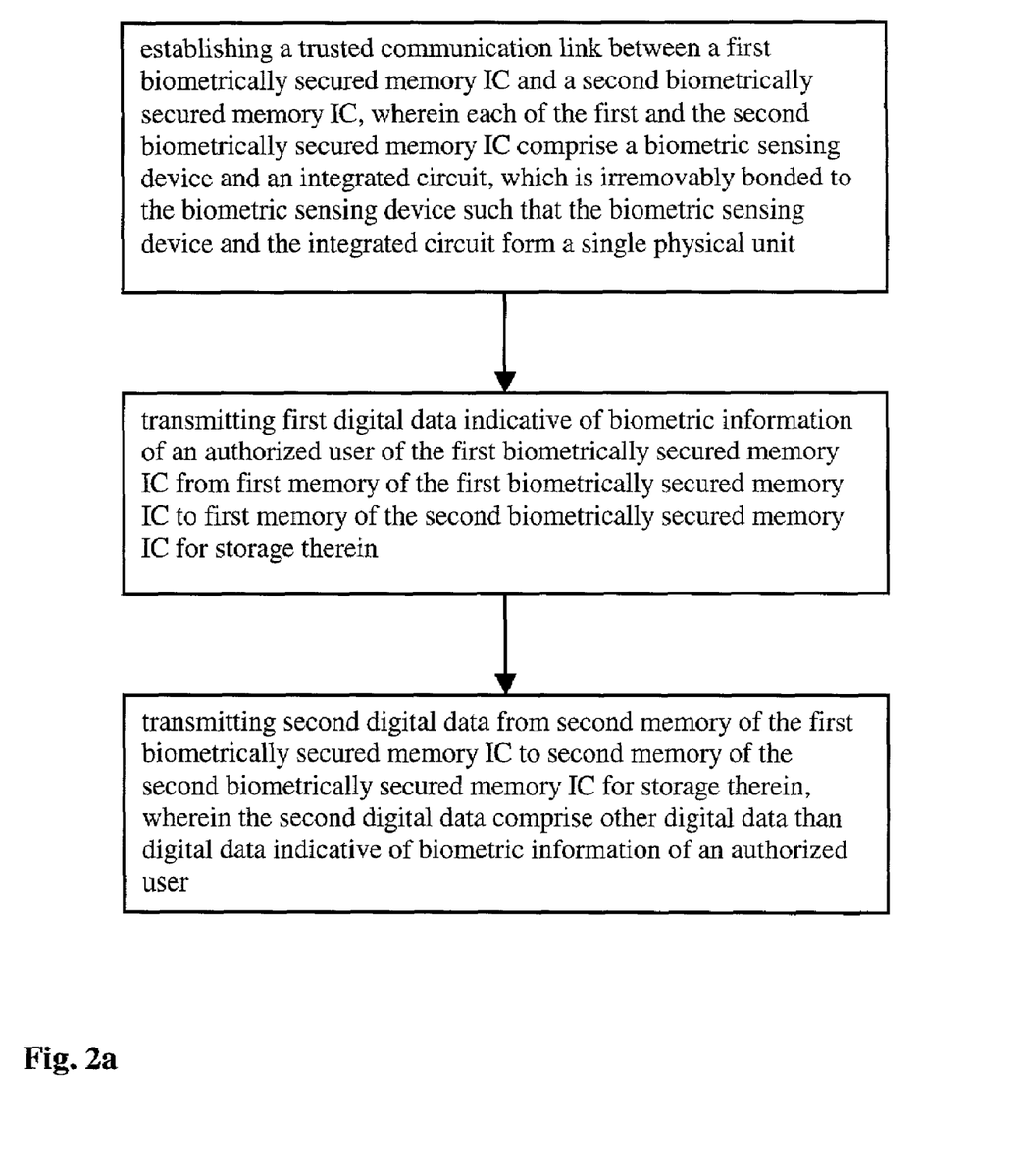
FIG. 2a is a simplified flow diagram of a method according to the invention for copying digital data to a void biometrically secured memory IC.

FIG. 2*a* illustrates a simplified flow diagram of a method according to the invention for copying digital data from a first biometrically secured memory IC to a void second biometrically secured memory IC. A trusted communication link is established between the first biometrically secured memory IC and the second biometrically secured memory IC, for example, by mating respective connectors of the first and the second biometrically secured memory IC. In a following step first digital data indicative of biometric information of an authorized user of the first biometrically secured memory IC is transmitted from first memory of the first biometrically secured memory IC to first memory of the second biometrically secured memory IC and stored therein. This step ensures preauthorization of the void biometrically secured memory IC before transmission of the second data from second memory of the first biometrically secured memory IC to second memory of the second biometrically secured memory IC for storage therein. Furthermore, the step of establishing a secure communication link comprises identification of the second biometrically secured memory IC to the processor of the first biometrically secured memory IC as a valid device. If this validation fails, the copying process is denied. Therefore, an unauthorized third party is not able to access the second data using another device.

Figure 2B:
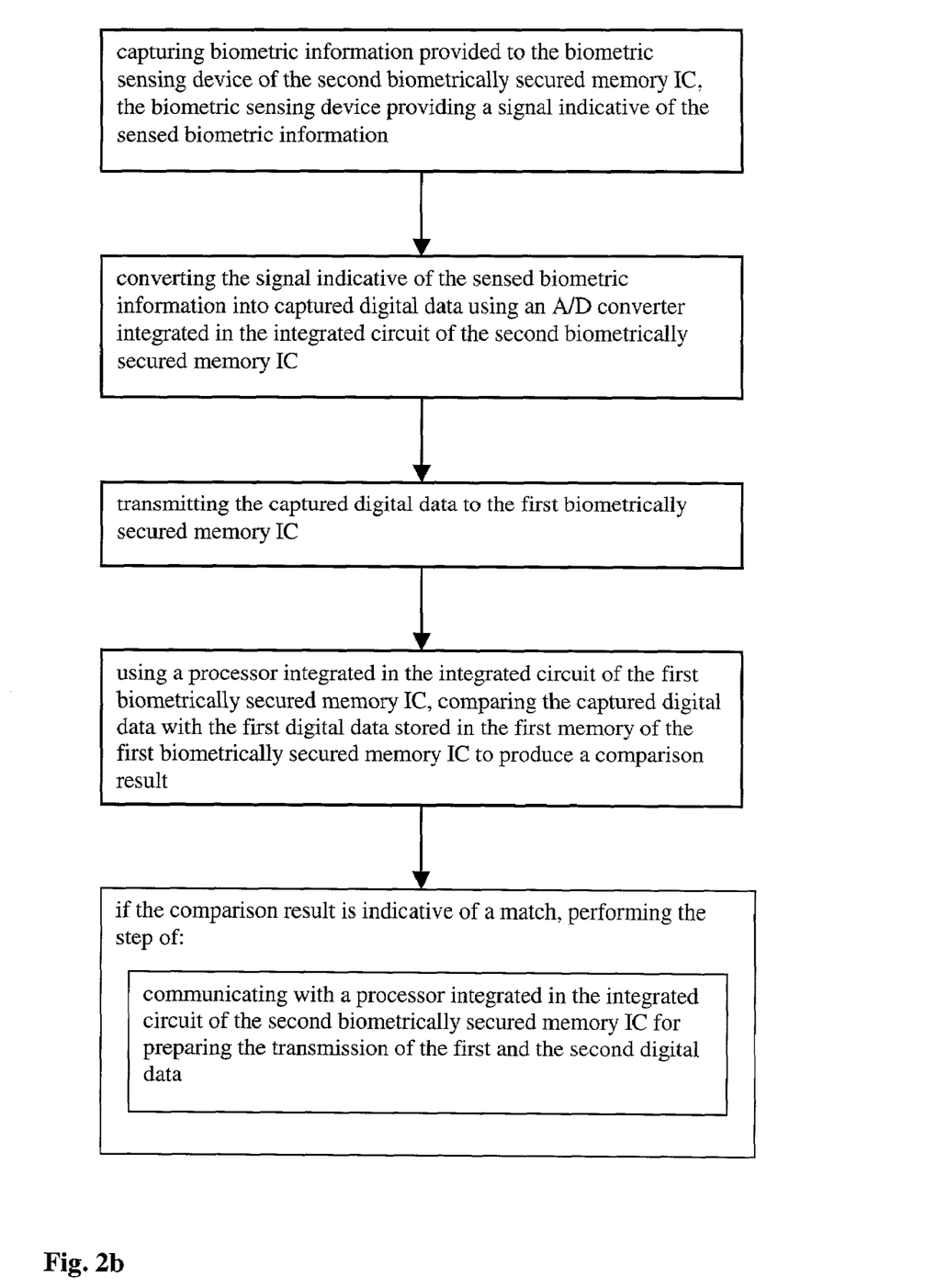

Security is further enhanced by requiring an authorized user to provide biometric information for identification as shown in the simplified flow diagram of FIG. 2*b*. Here, biometric information provided to the biometric sensing device of the second biometrically secured memory IC is captured and a signal indicative of the sensed biometric information is provided to the A/D converter integrated in the integrated circuit of the second biometrically secured memory IC. After conversion of the biometric information into captured digital data, the captured digital data is transmitted to the first biometrically secured memory IC. Using a processor integrated in the integrated circuit of the first biometrically secured memory IC, the captured digital data is compared with the first digital data stored in the first memory of the first biometrically secured memory IC to produce a comparison result. If the comparison result is indicative of a match the processor communicates with a processor integrated in the integrated circuit of the second biometrically secured memory IC for preparing the transmission of the first and the second digital data.

Alternatively, the processor of the second biometrically secured memory IC is used for comparing the captured digital data with the first digital data stored in the first memory of the first biometrically secured memory IC. If the comparison result is indicative of a match, the processor of the second biometrically secured memory IC stores the first data in the first memory of the second biometrically secured memory IC. The processor then accesses the second memory of the first biometrically secured memory IC for transmitting the second data and storing the second data in the second memory of the second biometrically secured memory IC. This alternative method is useful in case the processor of the first biometrically secured memory IC fails to operate properly.

Preferably, in any case, the ICs are each provided with a hardwired private key for use in forming a secure communication path between similar ICs for use in data transfer. In this way, data is never transferred as clear text and, as such, remains secure.

Figure 3A:
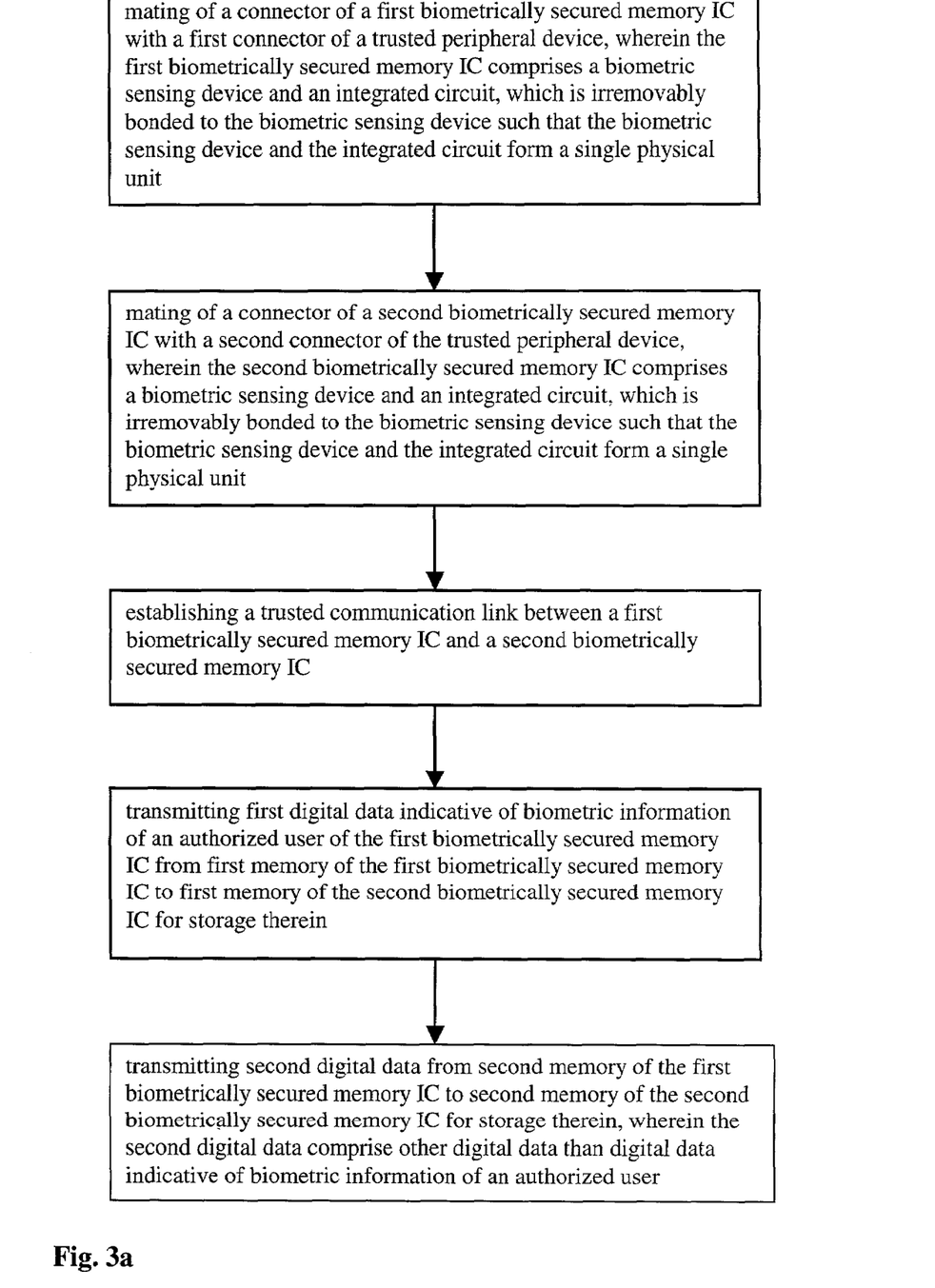

FIG. 3a illustrates a simplified flow diagram of another method according to the invention for copying digital data from a first biometrically secured memory IC to a void second biometrically secured memory IC. A connector of a first biometrically secured memory IC is mated with a respective first connector of a trusted peripheral device. A connector of a second biometrically secured memory IC is mated with a respective second connector of a trusted peripheral device. Then a trusted communication link between a first biometrically secured memory IC and a second biometrically secured memory IC is established. In a following step first digital data indicative of biometric information of an authorized user of the first biometrically secured memory IC is transmitted from first memory of the first biometrically secured memory IC to first memory of the second biometrically secured memory IC and stored therein. Second digital data from second memory of the first biometrically secured memory IC are then transmitted to second memory of the second biometrically secured memory IC and stored therein.

Figure 3B:
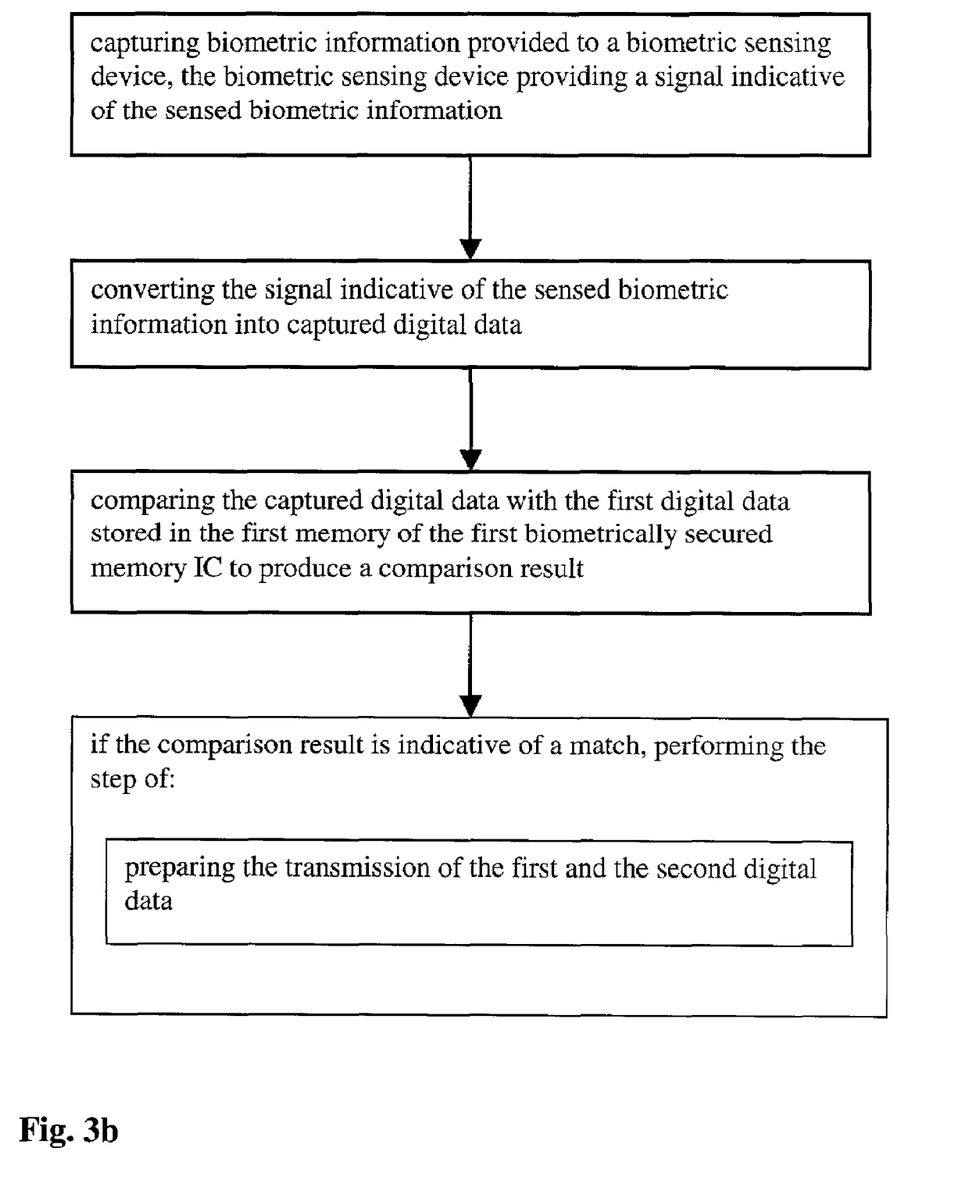

In the method shown in FIG. 3b, an authorized user is required to provide biometric information for identification before second data are copied to the second biometrically secured memory IC. In one embodiment the peripheral device comprises a biometric sensor, an A/D converter and a processor. Alternatively to the method shown in FIG. 2b, some or all of the steps of capturing biometric information, converting the captured biometric information into digital data, and comparing the captured digital data with the first digital data are performed using the peripheral device.

Optionally, the second biometrically secured memory IC is not void and second data are stored in available storage space of the second memory of the second biometrically secured memory IC. Copying of the second data is performed if the first data stored in the first memory of the first biometrically secured memory IC and the first data stored in the first memory of the second biometrically secured memory IC are indicative of a match. Copying is preferably performed via a secure communication path.

Numerous other embodiments of the invention will be apparent to persons skilled in the art without departing from the spirit and scope of the invention as defined in the appended claims.

What is claimed is:

1. A biometrically secured memory IC comprising:
   a sensing device for receiving biometric information provided thereto and for providing a signal indicative of the biometric information;
   an integrated circuit irremovably bonded to the sensing device such that the sensing device and the integrated circuit form a single physical unit, the integrated circuit comprising:
      an A/D converter for receiving the signal indicative of the biometric information and for providing digital data indicative of the signal;
      first memory for storing first digital data, wherein the first digital data comprise digital data indicative of biometric information of an authorized user of the memory IC;
      second memory for storing second digital data, wherein the second digital data comprise other digital data than digital data indicative of biometric information of the authorized user;
      a processor for receiving the digital data indicative of the biometric information, for comparing the digital data indicative of the biometric information with the first digital data to produce a comparison result, and if the comparison result is indicative of a match for providing access to the second memory; and,
      a port for providing and/or receiving the second digital data.

2. A biometrically secured memory IC as defined in claim 1, wherein the biometric information is fingerprint information.

3. A biometrically secured memory IC as defined in claim 2, wherein the integrated circuit comprises circuitry such that the second digital data stored in the second memory is only accessible if the processor provides access.

4. A biometrically secured memory IC as defined in claim 3, wherein the integrated circuit is irremovably bonded to the sensing device such that separation of the sensing device from the integrated circuit results in destruction of the integrated circuit erasing the second digital data.

5. A biometrically secured memory IC as defined in claim 3, wherein the port comprises a socket for removably joining the biometrically secured memory IC to an electronic device and wherein the socket is irremovably bonded to the integrated circuit.

6. A biometrically secured memory IC as defined in claim 5, wherein the socket is capable of mating with the socket of a second other biometrically secured memory IC for securely transmitting the second data to the second other biometrically secured memory IC in order to replace the biometrically secured memory IC.

7. A biometrically secured memory IC as defined in claim 6, wherein the processor of the biometrically secured memory IC and a processor of the second other biometrically secured memory IC comprise circuitry for identifying the second biometrically secured memory IC as a valid device before transmission of the second data.

8. A biometrically secured memory IC as defined in claim 5, wherein the integrated circuit, the sensing device and the socket form a physical unit such that an attempt by an unauthorized person to access the second digital data results in erasing of the digital data stored within the memory.

9. A biometrically secured memory IC as defined in claim 3, wherein the processor comprises circuitry for processing the second digital data if the comparison result is indicative of a match.

10. A biometrically secured memory IC as defined in claim 9, wherein the processor comprises circuitry for encrypting/decrypting at least a portion of the second digital data.

11. A biometrically secured memory IC comprising:
a capacitive fingerprint imager for receiving fingerprint information provided thereto and for providing a signal indicative of the fingerprint information;
an integrated circuit irremovably bonded to the capacitive fingerprint imager such that the capacitive fingerprint imager and the integrated circuit form a single physical unit, the integrated circuit comprising:
an A/D converter for receiving the signal indicative of the fingerprint information and for providing digital data indicative of the signal;
first non-volatile memory for storing first digital data, wherein the first digital data comprise digital data indicative of fingerprint information of an authorized user of the memory IC;
second memory for storing second digital data, wherein the second digital data comprise other digital data than digital data indicative of fingerprint information of the authorized user;
a processor for receiving the digital data indicative of the fingerprint information, for comparing the digital data indicative of the fingerprint information with the first digital data to produce a comparison result, and if the comparison result is indicative of a match for providing secured access to the second memory; and,
a port for providing and/or receiving the second digital data.

12. A biometrically secured memory IC as defined in claim 11, wherein the second memory comprises RAM.

13. A biometrically secured memory IC as defined in claim 11, wherein the second memory comprises ROM.

14. A biometrically secured memory IC as defined in claim 11, wherein the processor comprises circuitry for providing secured access, the secured access comprising only one of read or write access, and wherein the other is available without authorization.

15. A biometrically secured memory IC as defined in claim 11, wherein the port comprises a transmitter for wireless transmission of the second digital data, the transmitter being a portion of the integrated circuit.

16. A method for copying digital data from a first biometrically secured memory IC to a void second biometrically secured memory IC comprising:
a) establishing a trusted communication link between the first biometrically secured memory IC and the second biometrically secured memory IC, wherein each of the first and the second biometrically secured memory IC comprise a biometric sensing device and an integrated circuit, which is irremovably bonded to the biometric sensing device such that the biometric sensing device and the integrated circuit form a single physical unit;
b) transmitting first digital data indicative of biometric information of an authorized user of the first biometrically secured memory IC from first memory of the first biometrically secured memory IC to first memory of the second biometrically secured memory IC for storage therein; and,
c) transmitting second digital data from second memory of the first biometrically secured memory IC to second memory of the second biometrically secured memory IC for storage therein, wherein the second digital data comprise other digital data than digital data indicative of biometric information of an authorized user.

17. A method for copying digital data from a first biometrically secured memory IC to a void second biometrically secured memory IC as defined in claim 16, wherein establishing a trusted communication link comprises mating of a connector of the first biometrically secured memory IC with a respective connector of the second biometrically secured memory IC.

18. A method for copying digital data from a first biometrically secured memory IC to a void second biometrically secured memory IC as defined in claim 17, comprising:
capturing biometric information provided to the biometric sensing device of the second biometrically secured memory IC, the biometric sensing device providing a signal indicative of the sensed biometric information;
converting the signal indicative of the sensed biometric information into captured digital data using an A/D converter integrated in the integrated circuit of the second biometrically secured memory IC;
transmitting the captured digital data to the first biometrically secured memory IC;
using a processor integrated in the integrated circuit of the first biometrically secured memory IC, comparing the captured digital data with the first digital data stored in the first memory of the first biometrically secured memory IC to produce a comparison result; and,
if the comparison result is indicative of a match, communicating with a processor integrated in the integrated circuit of the second biometrically secured memory IC for preparing the transmission of the first and the second digital data.

19. A method for copying digital data from a first biometrically secured memory IC to a void second biometrically secured memory IC comprising:
a) mating a connector of the first biometrically secured memory IC with a first connector of a trusted peripheral device, wherein the first biometrically secured memory IC comprises a biometric sensing device and an integrated circuit which is irremovably bonded to the biometric sensing device such that the biometric sensing device and the integrated circuit form a single physical unit;
b) mating a connector of the second biometrically secured memory IC with a second connector of the trusted peripheral device, wherein the second biometrically secured memory IC comprises a biometric sensing device and an integrated circuit, which is irremovably bonded to the biometric sensing device such that the biometric sensing device and the integrated circuit form a single physical unit;
c) establishing a trusted communication link between a first biometrically secured memory IC and a second biometrically secured memory IC;
d) transmitting first digital data indicative of biometric information of an authorized user of the first biometrically secured memory IC from first memory of the first biometrically secured memory IC to first memory of the second biometrically secured memory IC for storage therein; and,
e) transmitting second digital data from second memory of the first biometrically secured memory IC to second memory of the second biometrically secured memory IC for storage therein, wherein the second digital data comprise other digital data than digital data indicative of biometric information of an authorized user.

20. A method for copying digital data from a first biometrically secured memory IC to a void second biometrically secured memory IC as defined in claim 19, comprising:
   capturing biometric information provided to a biometric sensing device, the biometric sensing device providing a signal indicative of the sensed biometric information;
   converting the signal indicative of the sensed biometric information into captured digital data;
   comparing the captured digital data with the first digital data stored in the first memory of the first biometrically secured memory IC to produce a comparison result; and,
   if the comparison result is indicative of a match, preparing the transmission of the first and the second digital data.

21. A method for copying digital data from a first biometrically secured memory IC to a void second biometrically secured memory IC as defined in claim 20, wherein the biometric information is captured using a biometric sensing device of the trusted peripheral device.

22. A method for copying digital data from a first biometrically secured memory IC to a void second biometrically secured memory IC as defined in claim 21, wherein the signal indicative of the sensed biometric information is convened into captured digital data using an A/D converter of the trusted peripheral device.

23. A method for copying digital data from a first biometrically secured memory IC to a void second biometrically secured memory IC as defined in claim 22, wherein the captured digital data is compared with the first digital data stored in the first memory of the first biometrically secured memory IC using a processor of the trusted peripheral device.

* * * * *